July 31, 1962  R. A. SAHA  3,047,110
INPROVED BRACKET AND METHOD OF ASSEMBLY UTILIZING IT
Filed Aug. 14, 1959  2 Sheets-Sheet 1
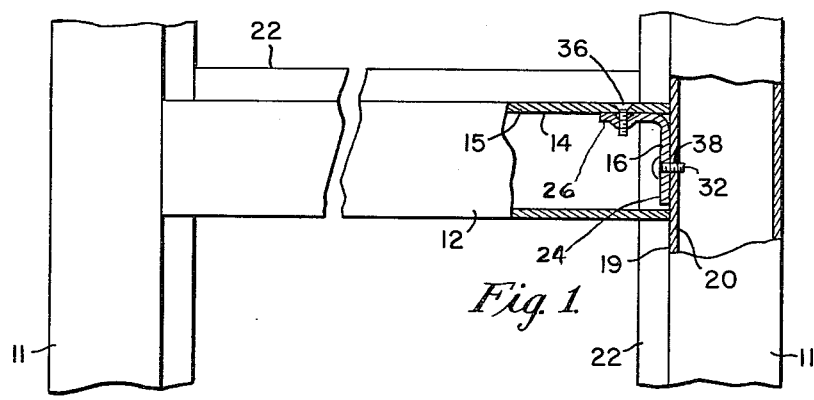
Fig. 1.
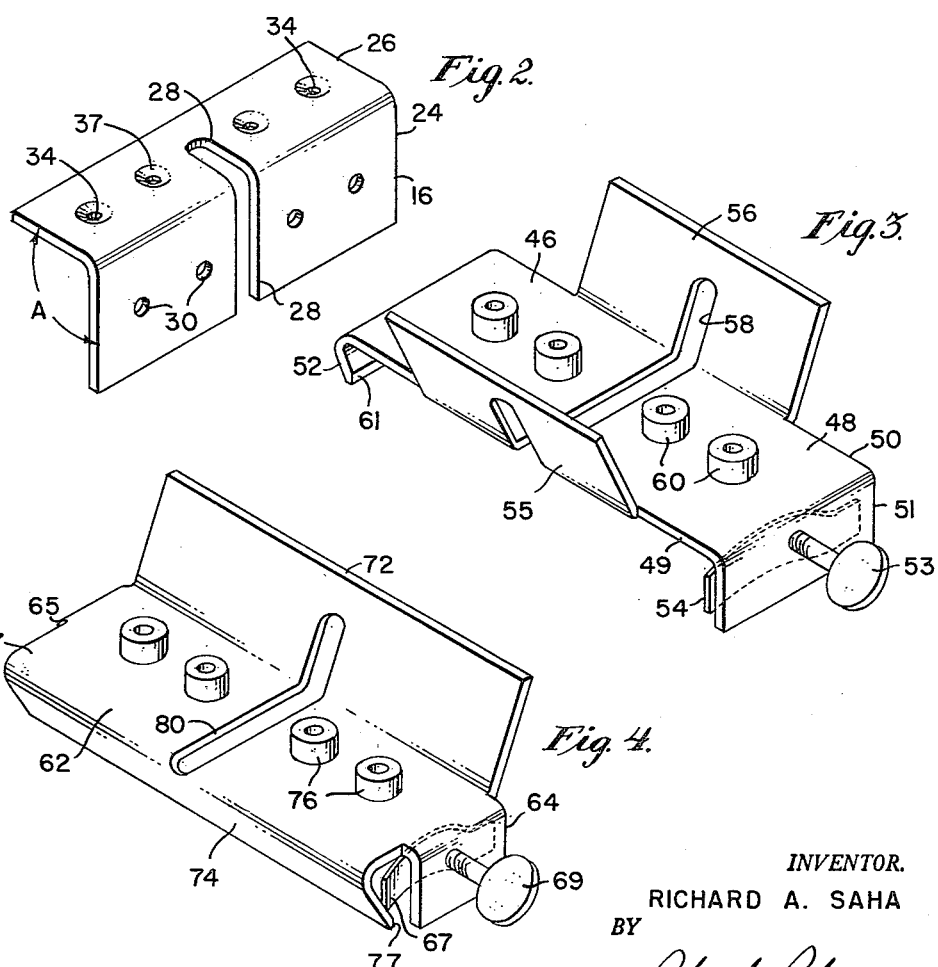
Fig. 2.
Fig. 3.
Fig. 4.
INVENTOR.
RICHARD A. SAHA
BY
Peter J. Patane
HIS ATTORNEY.

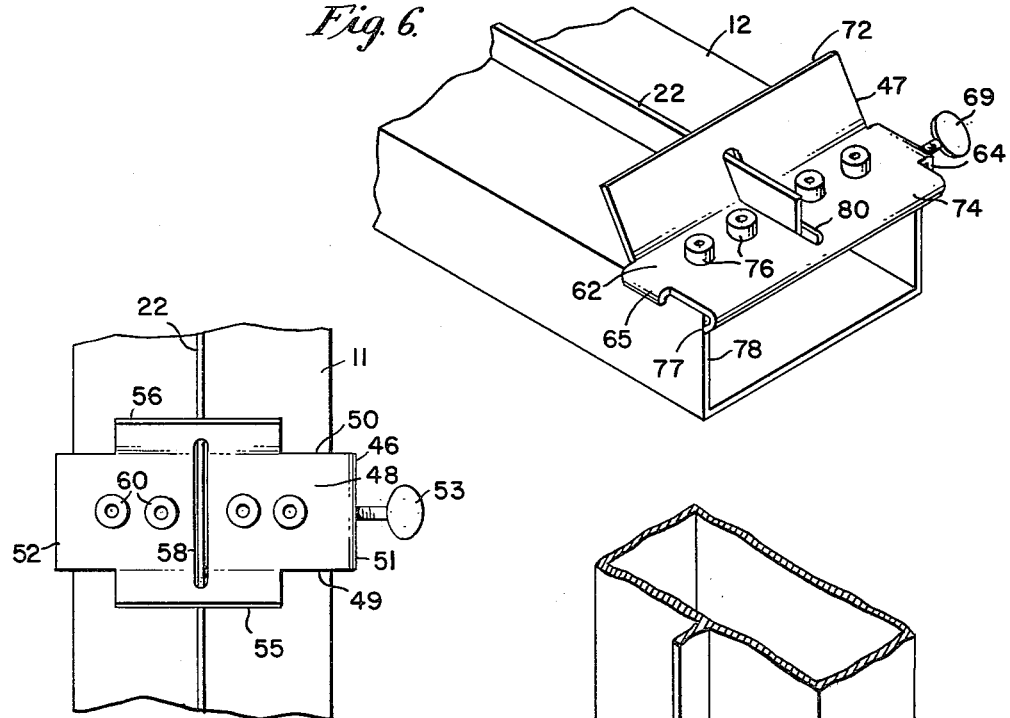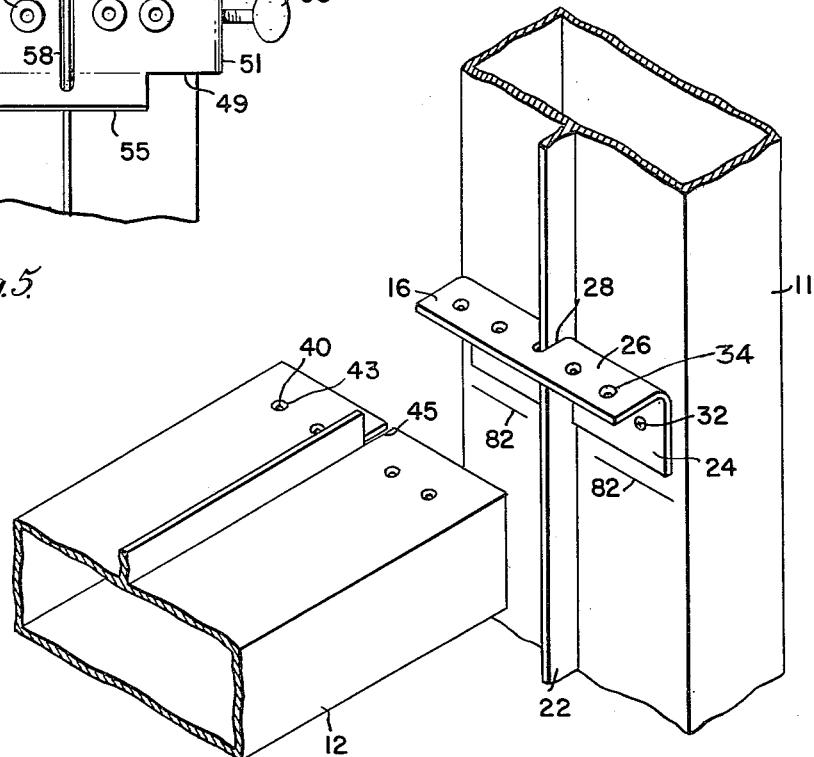

United States Patent Office 3,047,110
Patented July 31, 1962

3,047,110
IMPROVED BRACKET AND METHOD OF ASSEMBLY UTILIZING IT
Richard A. Saha, 101 S. 11th St., Darby, Pa.
Filed Aug. 14, 1959, Ser. No. 833,832
8 Claims. (Cl. 189—36)

This invention relates to improved brackets and improved jigs utilized in connection with the assembly of tubular structural members and also relates to an improved method of assembly of tubular structural members. It is an object of the present invention to expedite and facilitate the utilization of tubular members in the construction of structures therefrom.

Presently, many commercial installations are being made utilizing extruded tubular aluminum members for the jambs and frames of doorways and windows, respectively. The advantages of aluminum are well known in that it provides a construction requiring a minimum upkeep and, as a metal, is soft and relatively easy to work. In many instances right angle connections must be made between such tubular members. These connections have heretofore been made utilizing clamps for properly aligning the members while they are joined. In commercial installations, where doorways may be as large as 7 feet by 8 feet or larger, this has required long clamps which are difficult to handle. The foregoing has necessitated the work of skilled mechanics increasing the labor cost. It is a further object of the present invention to provide a bracket constructed to facilitate a right angle connection between connected members so that less skilled mechanics may be utilized.

Previously, after the jambs had been correctly assembled and clamped together with the connectors, the necessary drilling between connectors and tubular members was done. It is another object of the invention to provide jigs for drilling the tubular members individually and without requiring that they be in the final assembled position.

Since the tubular members have had to be assembled in the final position before the drilling could take place, it has been customary to assemble and clamp them in this position on the job site, which is not always convenient. Otherwise the assembled and clamped members had to be taken to the job site assembled. As is readily apparent, transporting an assembly of the tubular members of such dimensions can be a cumbersome affair. It is a still further object of the invention to provide a method of assembly which can be expeditiously performed on the job site utilizing tubular members and brackets that are correctly predrilled, if desired, or which may be drilled on the job site, if desired.

The aluminum tubular members are connected by a steel bracket having legs that are at an included angle between each other of 88° to 89°. The leg of the bracket which is secured lastly is provided with holes that are offset from the cooperating holes in the tubular member for drawing the tubular members toward each other and tending to make a snug joint.

The holes in the tubular members for connecting the bracket thereto are formed by utilizing jigs. The jigs are positioned on the tubular members generally laterally by being provided with openings into which a rib of the tubular member extends. The jigs are provided with bent edge portions which are deformed to properly locate the jigs on the tubular members.

Assembly of the tubular members is accomplished by first determining where the joint is to be made. An indicating mark is made on one tubular member indicating the position of the other member thereon when the joint is finished. The one jig is placed on this tubular member and holes made to which the bracket will be connected. Holes are made in the other tubular member by utilizing the jig thereon also. The bracket is first secured by screws to an outside surface of one tubular member. The other tubular member is slipped over the bracket and secured by other screws to an inside surface of the other leg thereof. In tightening the screws between the second tubular member and the bracket, the offset holes, and the included angle of between 88° and 89° tend to tighten the joint and insure that a right angle snug joint will result.

The foregoing and other objects of this invention, the principles of this invention, and the best mode in which I have contemplated applying such principles will more fully appear from the following description and accompanying drawings in illustration thereof.

In the drawings,

FIG. 1 illustrates a partial side elevation of a frame for a doorway and a window overhead, a joint portion of which has been broken away to show the bracket of this invention in cross section;

FIG. 2 is a perspective view of a bracket constructed in accordance with this invention;

FIG. 3 is a perspective view of a jig constructed in accordance with this invention;

FIG. 4 is a perspective view of a second jig constructed in accordance with this invention;

FIG. 5 is a top view of the jig illustrated in FIG. 3 operatively associated with a tubular member;

FIG. 6 is a perspective view of the jig illustrated in FIG. 4 but operatively associated with another tubular member; and FIG. 7 is a perspective view illustrating the bracket assembled to one tubular member with the second tubular member about to be connected to the first member.

Referring to the drawings in detail, in FIG. 1 there are illustrated two vertical tubular members 11 bridged by a horizontal tubular member 12. The tubular members 11 and 12 are preferably extruded and formed from aluminum. The space below the longitudinal member and between the vertical member defines a space for a doorway, the tubular members serving as jambs thereof. Similarly, the space above the horizontal member 12 is utilized for a window. The horizontal member 12 has an approximately flat inner surface 14 of an upper wall 15 connected by a bracket 16 to the flat outer surface 19 of the left-hand wall 20. Preferably the bracket 16 is constructed of steel. The walls 15 and 20 are made integrally with outwardly extending ribs 22.

One bracket 16 is utilized at each joint between the horizontal member 12 and the vertical members 11 so that in the assembly illustrated in FIG. 1 two brackets 16 would be utilized. However, since the brackets and joints are substantially identical the subsequent description is in terms of only one bracket and one joint, it being understood the other is constructed substantially the same.

As illustrated, the bracket 16 has a vertical leg 24 that is longer than the horizontal leg 26. The included angle A between the right-hand face and upper face, respectively, of the legs 24 and 26 (which abut the tubular members 11 and 12) is between 88° and 89° tending to tighten the right angle joint between the horizontal member 12 and the vertical member 11. It has been found that steel brackets 16 having included angles below the specified range produced distortion of the aluminum tubular members 11 and 12. Included angles between 89° and 90° failed to produce sufficient relative motion between tubular members 11 and 12 to tighten the joint. The vertical leg 24 is provided with holes 30 large enough to allow the threaded portion of "self-tapping" screws 32 to enter without marring the threads thereof.

Both legs 24 and 26 of the bracket 16 are provided with slits or openings 28 for accommodating the rib 22 on the vertical member 11. The slit 28 completely divides the vertical leg 24 into two portions but the horizontal leg 26 is not completely divided thereby, as illustrated. The horizontal leg 26 is provided with holes 34 that are threaded to receive screws 36. The metal encompassing holes 34 is depressed or countersunk, at 37, for the hereinafter specified purpose.

The vertical member 11 is provided with holes 38 aligned with the holes 30 in the leg 24. The screws 32 are hard enough and adapted to tap threads into the aluminum wall 20 as they are turned into it. Similarly, the horizontal member 12 is provided with holes 40 (FIG. 7) to cooperate with the holes 34 in the leg 26. The holes 40 in the horizontal member 12 are large enough to allow the threaded portion of the screws 36 to pass therethrough without marring their threads and have countersunk outer portions, at 43, to accommodate the cone shaped underside of the flat heads, so that the flat heads thereof may be turned flush with the wall. The horizontal member 12 is provided with slits 45 to accommodate the rib 22.

The outer corner of the bracket 16 (between legs 24 and 26) is well rounded to prevent contact between the corner and any burrs that might be formed at the edge formed by surface 41 and the face 78 during cutting of the horizontal tubular member to size.

To facilitate the drilling of the holes 38 and 40, jigs 46 and 47 are provided.

The jig 46 is preferably formed from one piece of metal and includes a flat body portion 48 having longitudinal parallel edge portions 49 and 50. The jig 46 has end portions or lips 51 and 52 depending from the flat surface portion thereof. The end portion 51 is bent at substantially a right angle to the flat portion 48 and is provided with a threaded hole accommodating a thumb screw 53. A flat flexible leaf 54 (FIG. 3) is secured at one end portion to the lip 51 and the end of the screw 53 bears against a flat portion of the leaf which is biased by the screw 53 against the side of the member 11, when the jig 46 is in the position illustrated in FIG. 5, to prevent the aluminum from being marred and to prevent cocking of the jig 46 with respect to the member 11 when the screw 53 is tightened. The lip 52 is turned to an angle of substantially less than 90° between the portion 52 and the flat portion 48 and is provided with a flattened edge 61.

Integrally with the edge portions 49 and 50, are handle portions 55 and 56 flaring from the flat portion 48. The handle portions 55 and 56 and the flat portion 48 are provided with a slit 58 to accommodate the rib 22.

Holes are drilled in the flat portion 48 in which are driven bushings 60 having the diameter suitable for drilling holes 38, the bushings 60 being equi-spaced between the edges 49 and 50. Lateral positioning relative to the longitudinal axis of the tubular member 11 is determined approximately by placing the rib 22 in the slit 58. The lateral spacing is determined accurately from the flattened edge 61 of lip 52. Bending the end portion 52 more or less will change the lateral position of the bushings 60.

The jig 47 is similarly constructed from one piece of metal and includes a flat portion 62 having end portions or lips 64 and 65. The portion 64 is bent at substantially a right angle to the flat body portion 62 and is provided with a flexible leaf 67 (FIG. 4) and a thumb screw 69, as and for the purposes described in connection with the jig 46. Also, the lip 65 is bent to form an included angle of less than 90° with respect to the flat portion 62 and has flattened edge for lateral positioning of the jig 47 similar to flattened edge 61 specified for jig 46.

The jig 47 is provided with a longitudinal handle portion 72. A turned-down longitudinal portion 74 is bent to form an angle of less than 90° with the flat portion 62. The flat portion 62 is provided with holes into which are driven bushings 76 suitable for use in drilling holes 40 in the horizontal member 12. The portion 74 has a flattened edge 77 for abutting the end face 78 of the horizontal member 12. The position of the bushings 76 from the face 78 is determined accurately from the edge 77, by abutting the edge 77 with the end face 78 after the portion 74 has been bent the proper amount. A slit 80 accommodates the rib 22 and provides approximate lateral placement, as for jig 46.

The bushings 76 are located with respect to the flattened edge 77 so the distance between their centers and the surface 19 of wall 20 (of the vertical member 11) is slightly greater, upon initial assembly, than the distance between the centers of the holes 34 (in the bracket 16) and the surface 19. This produces holes 40 and 34 that are offset slightly relative to each other but which are close enough to receive the screws. The offset between holes 40 and 34 tends to draw the horizontal member 12 toward the vertical member 11 upon assembly of the screws within holes 40 and 34. Preferably, the offset is about .025 inch.

The foregoing bracket 16 and jigs 46 and 47 are utilized as follows: The vertical members 11 are cut to a predetermined size. The horizontal member 12 is cut to proper size, equal to the distance between opposed faces of the members 11, and with substantially flat end faces 78 that are perpendicular to the longitudinal axis of the tubular member 12.

The jig 47 is placed upon the end portion of the horizontal member 12, as illustrated in FIG. 6, so that the rib 22 extends through slit 80 and the end portion 74 abuts the end face 78 of the member 12 for properly spacing the bushings 76 from the end face. The thumb screw 69 is then tightened until the end portion 65 abuts the member 12 for accurately positioning the bushing laterally with respect to the longitudinal axis of the member 12 and the holes 40 drilled.

Upon the vertical members 11, there is struck one or more scribe lines 82, indicating the bottom, illustrated in FIG. 7, of the horizontal member 12 after the members are connected. The jig 46 is then positioned upon the member 11 so that the rib 22 extends through the slit 58 and the edge 49 is positioned on the lines 82. While the jig 46 is held in this position the thumb screw 53 is tightened for accurately positioning the bushings laterally. The holes 38 are then drilled by utilizing bushings 60.

If a line had been struck upon the member 11 indicating the top of the member 12 when in abutment with the vertical member 11, such line not being illustrated, then the top edge of the jig would be aligned with this line. Also, if a butt joint (not illustrated) in which the tubular member 11 terminates flush with the upper surface of wall 15 were being constructed, then the upper edge 50 would have been aligned with the end face (not illustrated) of the tubular member 11.

The jig 47 is positioned upon the ends of the horizontal member 12 so that the rib 22 extends through slit 80 and the edge 77 abuts the end face 78 of the member 12. Thereafter, the thumb screw 69 is turned to secure the jig in position. The holes 40 are then drilled. In drilling these holes it sometimes happens that burrs are formed which extend beyond surface 14. The countersinking 37 of holes 34 accommodates these burrs and enables the major portion of the leg 26 to be brought flush with the wall 15 when the screws 42 are turned fully, to insure a right angle joint. After the holes 38 and 40 are drilled, the jigs 46 and 47 are removed, and the holes 40 countersunk.

The leg 24 of a bracket 16, previously constructed with the proportions, shape, etc. heretofore specified, is assembled to the outer surface 19 of the vertical member 11 by screws 32 which extend through holes 30 and 38, tapping threads as they are turned into hole 38. The head of the screws 32 has a flat underside and forces the vertical leg 24 to abut the surface 19. The horizontal tubular member 12 is then slipped over the bracket 16 so that the surface 14 is upon the leg 26 and the screws 36 are placed through the holes 40 and 34. As mentioned, the holes 40 and 34 are offset one from another and the angle between vertical and horizontal legs is between 88° and 89°. During the turning of the screws 36 the horizontal tubular member 12 will be drawn toward the vertical tubular member 11 because of the offset which tends to tighten the upper portion, as illustrated in FIG. 1, of the joint. Also, the vertical tubular member 11 will tend to pivot about the upper portion of the joint tending to tighten the lower portion of the joint.

Thus, from the foregoing it is seen that a bracket 16 has been provided which tends to make a snug and close joint between connected members. By the use of the jigs less skilled workers can perform the needed operations and the assembly. Further, the drilling of the members can be performed in the shop and need no longer be performed on the job site.

The jigs described herein are described and claimed in my copending patent application, Serial No. 33,176.

Having described the invention, I claim:

1. In combination, first and second tubular members to be connected in abutment with each other substantially at 90° to each other, a bracket for connecting said first and second tubular members, said bracket having two legs one each of which is secured to each of said tubular members, one of said legs being secured to an outside surface of one tubular member and the other leg being secured to an inside surface of the other tubular member, said tubular members having holes by which said bracket is secured, one of said legs having holes offset from the holes in said tubular member such that the holes in said second tubular member are spaced further from said first tubular member than the holes in the associated leg of said bracket, fasteners extending through both legs of said bracket and the cooperating holes in said tubular members, the fasteners extending through said offset holes drawing said second tubular member toward said first tubular member, said legs of said bracket defining an included angle between 88° and 89° for rotating said tubular members toward each other and thereby tending to make the joint snug between the first and second tubular members.

2. The structure recited in claim 1 wherein said tubular members are formed of a material which is softer than said bracket.

3. In combination, first and second tubular members to be connected in abutment with each other and at substantially 90° to each other, a bracket disposed within one of said tubular members, said bracket being secured to an inside surface of the tubular member within which it is disposed and to an outside surface of the other member, said bracket having two legs disposed at an included angle of less than 90°, whereby upon securement to the tubular members the tubular members will tend to pivot toward each other but any gap between a leg and the surfaces of the tubular members to which it is secured will be hidden from view by the tubular member which covers the bracket.

4. In apparatus of the character described a bracket securable within one tube for joining said tube in substantial right angle abutment with another tube, said bracket having two legs each of which is secured to one of said tubes, and said legs being disposed at an angle of less than 90° to each other.

5. In apparatus of the character described a bracket securable within one tube for joining to another tube, said bracket having two legs disposed at an angle of less than 90° to each other, one leg having a hole offset from the corresponding hole in the tubular member to which it is to be secured such that the hole in the leg is closer to the other leg than the hole in the tubular member but the holes being close enough to receive fasteners.

6. The method of assembling tubular elements comprising forming holes in the first tubular element, forming holes in a second tubular element, forming a bracket having arms that are disposed at an included angle of less than 90° with holes in said arms, securing said bracket to said tubular element by placing fasteners through said holes in said bracket and said first tubular element, placing said second tubular element over said bracket and in abutting relation with said first tubular element, and placing screws through said holes in said second tubular element and said bracket for rotating said members toward each other and tightening the joint therebetween.

7. The method of assembling tubular elements comprising forming holes in a first tubular element, forming holes in a second tubular element, forming a bracket having arms thereof that are at an included angle of between 88° and 89° with holes in said arms, securing said bracket to said first tubular element by placing fasteners through said holes in said bracket and said first tubular element, placing said second tubular element over said bracket and in abutting relation with said first tubular element, and placing screws through said holes in said second tubular element and said bracket for rotating said members toward each other for tightening the joint therebetween.

8. The method of assembling tubular elements comprising placing a jig upon a first tubular element adjacent an approximately flat end face, securing said jig to said first tubular element, forming holes in said first tubular element by the use of a jig, forming holes in a flat wall of a second tubular element by the use of a jig, forming a bracket having arms thereof that are at an included angle of between 88° and 89° with holes in one arm of said bracket, placing holes in the second arm of said bracket that are offset so that with respect to said holes in said second tubular member by being closer to said first arm than the holes in said second tubular member when the second tubular member is placed over the bracket but sufficiently close to each other to insert fasteners therethrough, securing said bracket to said first tubular element by placing fasteners through the first holes in said bracket and the holes in said first tubular element, placing said second tubular element over said bracket with the approximately flat end face in position to abut said flat wall of said first tubular element, and placing screws through said holes in said second tubular element and the offset holes in said bracket for simultaneously drawing said second tubular element toward said first tubular element and rotating said members toward each other for tightening the joint therebetween.

References Cited in the file of this patent

UNITED STATES PATENTS

| | | |
|---|---|---|
| 1,237,143 | Allen | Aug. 14, 1917 |
| 1,872,616 | Andren | Aug. 16, 1932 |
| 1,971,200 | Proctor et al. | Aug. 21, 1934 |
| 2,574,350 | Peelle | Nov. 6, 1951 |
| 2,784,812 | Kindorf | Mar. 12, 1957 |
| 2,838,966 | Campbell | June 17, 1958 |
| 2,843,232 | Goldberg | July 15, 1958 |
| 2,874,598 | Vick | Feb. 24, 1959 |